May 14, 1935.  K. KLINGER  2,001,616
PACKING PLATE WITH SCREEN LINING AND PROCESS FOR MANUFACTURING SAME
Filed Sept. 30, 1932
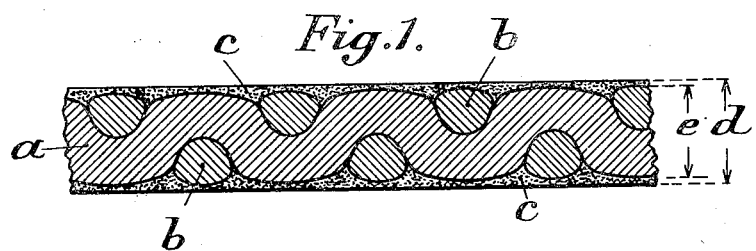
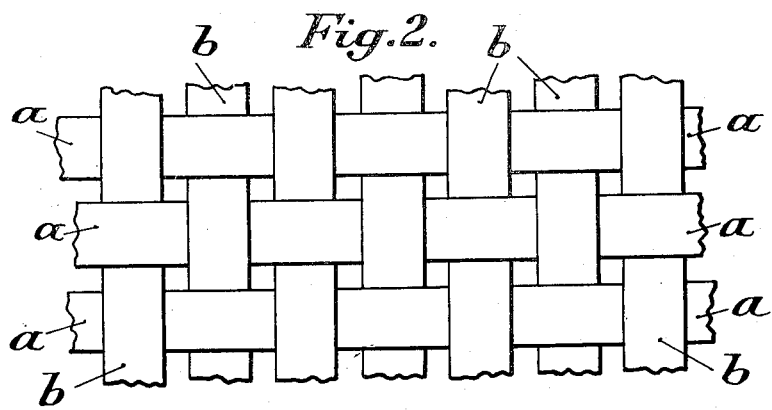
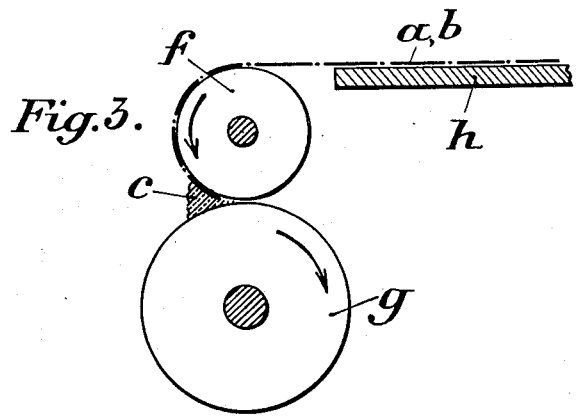
INVENTOR:
Karl Klinger
BY
ATTORNEY:

Patented May 14, 1935

2,001,616

UNITED STATES PATENT OFFICE 2,001,616

PACKING PLATE WITH SCREEN LINING AND PROCESS FOR MANUFACTURING SAME

Karl Klinger, Gumpoldskirchen, near Vienna, Austria, assignor to Naamlooze Vennootschap Irma Industrie en Ruwmaterialen Maatschappij, Rotterdam, Netherlands, a corporation of the Netherlands Application September 30, 1932, Serial No. 635,707
In Germany January 30, 1932

1 Claim. (Cl. 91—70)

Packing or gasket plates with metallic linings or skeletons, and more especially with metal grid reinforcement, are known. In the case of these known packings, the object of the metallic lining was to afford firm anchorage and reinforcement for the packing mass of fairly large thickness, that is to say, to increase its breaking resistance, the packing mass itself being held responsible for preventing leakage. For this reason packing plates of this kind had to be at least twice as thick as the metallic lining. The grid reinforcements previously used were wide mesh screens of limited strength.

In accordance with the present invention, the grid lining is used not only for reinforcing the packing, but also to act as actual packing material. Since, however, a grid alone would not be able to prevent leakage, it is so shaped and combined with a packing mass pressed into and on to it as to cause it to operate like a labyrinth packing, that is to say, it offers a number of uniform and successive obstacles in the path of the medium that is to be sealed.

The packing plate according to this invention is characterized essentially by comprising a single grid of metal of high tensile strength and yet plastic to a certain extent, and a packing mass pressed into the grid and in amount to fill up all the meshes of the grid and to transform the surfaces of the grid into smooth surfaces.

Consequently, the packing plates in accordance with this invention are of a thickness which does not materially exceed that of the metal grid. The packing mass used is such as is the most suitable for the purpose intended. Since the subject matter of the invention applies mainly to high quality packings, for example to packing for cylinders and cylinder heads in internal combustion engines, the packing mass is a plastic mass composed of asbestos fibres with suitable binding and hardening media. A packing mass of this nature offers special advantages in the case of packings exposed to the effect of great heat or combustion, since the carbon deposited or precipitated during the combustion process is absorbed by the packing mass, thus hardening it, and consequently the metallic lining is shielded from any decomposing effect.

Moreover, in the case of a packing of this kind, only that portion of the mass lying in the open meshes around the opening to be packed is exposed to high temperatures and other chemical and physical effects. The mass lying in the neighbouring meshes is protected by means of the wire netting against the action of the waste gases in the engine that is to be packed. Owing to this circumstance the wire netting assumes the actual task of a packing. There is no risk of the ends of the wires becoming red hot and thus causing any misfiring of the engine, since the wires of which the grid is composed are in metallic contact one over the other and carry off the heat from the combustion space into the open.

The process for manufacturing packing plates in accordance with the invention comprises essentially rolling on to a calender, such as used for the manufacture of high pressure packing plates (i. e. It plates—see Ullmann's Encyclopaedia, 2nd edition, vol. 1, page 636; vol. 3, page 680; and vol. 6, page 518) a thin layer of packing mass, whereupon, more packing mass being added, the wire grid is passed between the rollers, and, finally, a thin top layer is rolled on to the lining pressed by the rollers into the first layer of the mass, whereby the meshes of the latter are filled up by the last added mass.

In this process of manufacture it is possible to roll out the packing mass into very thin layers, each of a fraction of a millimetre, and to manufacture the entire packing plate in the manner above described and in such a way that its thickness exceeds that of the metal grid by only a fraction of a millimetre, a uniform distribution and arrangement of the asbestos fibres being at the same time attained.

In accordance with the process claimed in this invention, packing plates are manufactured from which the packings can then be cut or punched to any desired shape and size. When thicker packings are to be turned out, correspondingly thicker wire-screen linings must be used, or a number of packing plates made in accordance with the novel process can be joined together so as to form one packing. The reinforcement of the packings by putting on a further portion of the mass, for example in the form of raised protuberances, does not come into question so far as the purpose of this invention is concerned, since the metallic lining would thereby be deprived of its packing effect.

A packing plate made in accordance with the present invention, and a device for manufacturing packing plates of this type are shown by way of example on the accompanying drawing, in which Fig. 1 is a partial section through a packing plate made in accordance with the invention, Fig. 2 being a top view of the metallic grid used as a lining and Fig. 3 showing diagrammatically a device for manufacturing packing plates in accordance with the invention.

As will be seen in Figs. 1 and 2, the wire netting is composed of metallic warp threads $a$ and metallic weft threads $b$, the meshes running about twenty to forty to the lineal inch. The material of which the wire netting is composed consists of some heat-resisting and chemically suitable metal, such as for example low-carbon steel. The interstices between these threads, i. e., the meshes, are filled with a packing mass $c$ composed of asbestos fibres and binding agents which are heat-resisting. The overall thickness $d$ of the packing is only a trifle greater than the overall thickness $e$ of the metallic grid. The difference between the dimensions $d$ and $e$ is dependent upon the thickness of the packing, and amounts, in the case of a packing 1 mm. thick from 0.1 to 0.2 mm., that is to say, just enough to preserve a level and homogeneous surface underneath the grid.

A rolling-machine somewhat on the lines of an It plate calender is used for manufacturing plates in accordance with the invention and is shown diagrammatically in Fig. 3. The lower roller $g$ of this machine has a larger diameter than the upper roller $f$ and is heated, whilst the upper roller $f$ is cooled. When carrying out the process, the packing mass $c$ is inserted in the wedge between the upper roller $f$ and the lower roller $g$. The rollers are rotated in the direction indicated by the arrow, a fairly high pressure, for example 100 kilos per cm. cover length, being exerted.

A coating of, say, one-hundredth of a millimetre, in which the asbestos fibres are uniformly distributed is brought on to the lower roller $g$ every time the latter is rotated once. When after a suitatble number of revolutions of the lower roller $g$ the layer on that roller attains a thickness of 0.1 to 0.2 mm., the wire grid $a$, $b$ is fed in from a table $h$. The wire grid is wound around the upper roller $f$ and run in between the upper and lower roller, further quantities of packing mass $c$ being at the same time added underneath the screen.

On the further rotation of the two rollers, the packing mass lying on the lower roller, as well as the added fresh mass, owing to the high pressure exerted by the rollers, is pressed into the meshes of the wire netting, so that a very intimate union is effected between the layer on the roller and the grid.

The length of the grid is equal to the circumference of the lower roller $g$, so that after one complete revolution of that roller the grid $a$, $b$ extends exactly around the lower roller. A little more packing mass is added, so that the added mass is pressed from above into the meshes of the grid, whereby owing to the effect of the heat and of the high pressure exerted by the rollers it is pressed into the meshes and forms a compact union with the mass lying underneath the grid as well as with the grid itself. Finally, sufficient mass is added in order to transform the surface of the grid into a smooth, level surface.

The finished packing plate is then cut along the end edge of the grid and removed from the lower roller $g$. It can now be cut or punched into the correct shape for the packing.

The grid may consist of warp and weft threads of any desired section, for example, also of round or oval section.

The word "resistant" as used in the claim is defined as meaning resistant to the influences to which the packing is to be exposed.

I wish to be understood that I do not desire to be limited to the exact details of construction shown and described, for obvious modifications will occur to a person skilled in the art.

I claim:

A process for the manufacture of packing plates having a wire grid coated with plastic mass comprising, rolling on a heated calender and under high pressure a thin layer of the plastic mass, introducing between the calender rolls along with more of said mass a grid of uncoated metal wires of narrow mesh and forcing said grid into the thin layer of plastic mass, and rolling a thin layer of the plastic mass on top of the grid, the total amount of plastic mass being only sufficient to fill the meshes of the grid and convert its opposite faces into smooth surfaces.

KARL KLINGER.